(12) United States Patent
Lamle

(10) Patent No.: US 6,364,531 B1
(45) Date of Patent: Apr. 2, 2002

(54) BEARING RAIL SYSTEM

(75) Inventor: Michael E. Lamle, Syracuse, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 09/532,720

(22) Filed: Mar. 22, 2000

Related U.S. Application Data
(60) Provisional application No. 60/125,843, filed on Mar. 24, 1999.

(51) Int. Cl.[7] ............................................... F16C 29/06
(52) U.S. Cl. ................................ 384/45; 384/7; 384/42
(58) Field of Search ............................. 384/45, 42, 7, 384/44, 43

(56) References Cited

U.S. PATENT DOCUMENTS

| | | |
|---|---|---|
| 3,166,359 A | 1/1965 | Bleicher |
| 3,897,982 A | 8/1975 | Teramachi |
| 4,479,681 A | 10/1984 | Suzuki |
| 4,582,369 A | 4/1986 | Itoh |
| 5,118,204 A | 6/1992 | Peters |
| 5,172,982 A | 12/1992 | Komiya |
| 5,380,096 A | 1/1995 | Tanaka |
| 5,487,609 A | 1/1996 | Asada |
| 5,575,566 A | 11/1996 | Faulhaber |
| 5,672,010 A | 9/1997 | MacNicol et al. |
| 5,704,716 A | 1/1998 | Jantunen |
| 5,735,610 A | 4/1998 | Mark et al. |

*Primary Examiner*—Lenard A. Footland
(74) *Attorney, Agent, or Firm*—Barnes & Thornburg

(57) ABSTRACT

A bearing rail system for load-bearing transfer devices which includes a pair of split rail sections that are designed and configured to engage and lock together when manipulated in a rail channel. The rail channel can be provided in a support structure which functions as a guide for a load-bearing transfer system. The split rail sections include cooperating pivotal structures which can engage one another and about which the split rail sections can be pivoted so as to expand the overall or effective base of the rail system. By positioning the split rail sections in a rail channel and pivoting them about one another, the overall or effective base can be expanded to secure the rail system in the rail channel.

11 Claims, 5 Drawing Sheets

BEARING RAIL SYSTEM

RELATED APPLICATION

This application is based upon Provisional Patent Application Ser. No. 60/125,843, filed Mar. 24, 1999 the complete disclosure of which is hereby incorporated by reference.

TECHNICAL FIELD

The present invention is directed to linear rails for use in conjunction with bearing assemblies. More particularly, the present invention is directed to bearing rail systems which include split rail sections.

BACKGROUND ART

Linear bearing assemblies are used in a number of applications in which linear motion load bearing structures are employed. For example, linear bearing systems are used in conjunction with rodless cylinders to guide load bearing saddles or platforms which move in a reciprocating manner along an external surface of the rodless cylinder body.

Linear bearing assemblies generally include a plurality of bearings and a rail system upon or along which the bearings move. The rail system provides a load bearing surface and a guide for the bearings which roll along rails thereof.

The rail systems of linear bearing assemblies typically include one or more linear rail sections. The linear rail sections have to be secured to a base or support body along which a load bearing structure moves. One common manner of securing rail sections to a base or support body involves providing channels in the base or support body and positioning the rail sections in the channels. The channels can be configured with undercut sides which prevent the rail sections from coming out of the channels once the rail sections are slid into the channels. When channels are used, the rail sections need to be secured to prevent movement thereof within the channels. One manner of securing rail sections of a linear bearing assembly in a base or support body involves inserting the rail sections into a channel and thereafter deforming the channel by applying pressure thereto so that the rail sections become physically clamped in the deformed channels. Such a process can have adverse effects on the base or support bodies, due to the stress which is created in the area adjacent the deformed channels.

The present invention provides a bearing rail system which includes a pair of interlocking split rail sections that can be inserted into a rail channel and coupled together therein in a manner which secures the rail sections in position.

DISCLOSURE OF THE INVENTION

According to other features, characteristics, embodiments and alternatives of the present invention which will become apparent as the description thereof proceeds below, the present invention provides a bearing rail assembly which includes:

an elongate support;

at least one elongate channel formed in a surface of the elongate support; and a pair of elongate bearing rail elements that are configured to interlock together within the at lease one elongate channel and present bearing support and guide surfaces.

The present invention further provides a method of fabricating a rail bearing assembly which involves:

providing an elongate support;

forming at least one elongate channel in a surface of the elongate support;

providing a pair of elongate bearing rail elements that are configured to interlock together within the at lease one elongate channel and present bearing support and guide surfaces; and interlocking the pair of elongate bearing rail elements together within the elongate channel so that the bearing support and guide surfaces thereof are exposed from the surface of the elongate support.

BRIEF DESCRIPTION OF DRAWINGS

The present invention will be described hereafter with reference to the attached drawings which are given as non-limiting examples only, in which.

BEST MODE FOR CARRYING OUT THE INVENTION

The present invention is directed to bearing rail systems which include split rail sections. The split rail sections of the present invention are designed to interlock within a rail channel and thereby form a bearing rail. The manner in which the split rail sections interlock within a rail channel avoids the need of deforming the rail channel in any manner so as to clamp the bearing rail in place.

According to the present invention, the split rail sections are provided with cooperating structure by which they can be engaged so as to pivot against one another. The cooperating pivotal structures are provided at one end of the base of each split rail sections so that when the cooperating pivotal structures are engaged and the split rail sections are pivoted about each other, the overall base of the split rail assembly which is composed of the separate bases of each split rail section can be expanded. Thus, when outer edges of the split rail sections are positioned within a rail channel and pivoted about their engaged cooperating pivotal structures, the overall base of the split rail assembly can be expanded so as to become wedged in the rail channel. In such an instance, providing the edges of the rail channel with an overhanging or undercut structure will allow the outer edges of the split rail sections to be retained therein.

In order to maintain the split rail sections in their engaged or interlocked positions within a rail channel, their cooperating pivotal structures, bases, and/or the bottom of the rail channel can be designed or configured so that the point about which the engaged rail sections pivot is below a line of contact that extends between the points where the outer edges of the split rail sections engage and press against the adjacent edges of the rail channel. This ensures that the force applied by the rail channel across the engaged split rail sections will have a torque component that will tend to pivot the split rail sections into their engaged or locked position.

The split rail bearing assembly of the present invention can have bearing surfaces which are designed or configured to receive, contain and/or guide ball bearings, roller bearings, pin bearings, or any other type of bearing(s), including plastic bearing elements. Moreover, the split rail bearing assembly of the present invention can be used in conjunction with virtually any linear, rail-guided load-bearing transfer system.

Figure 1:
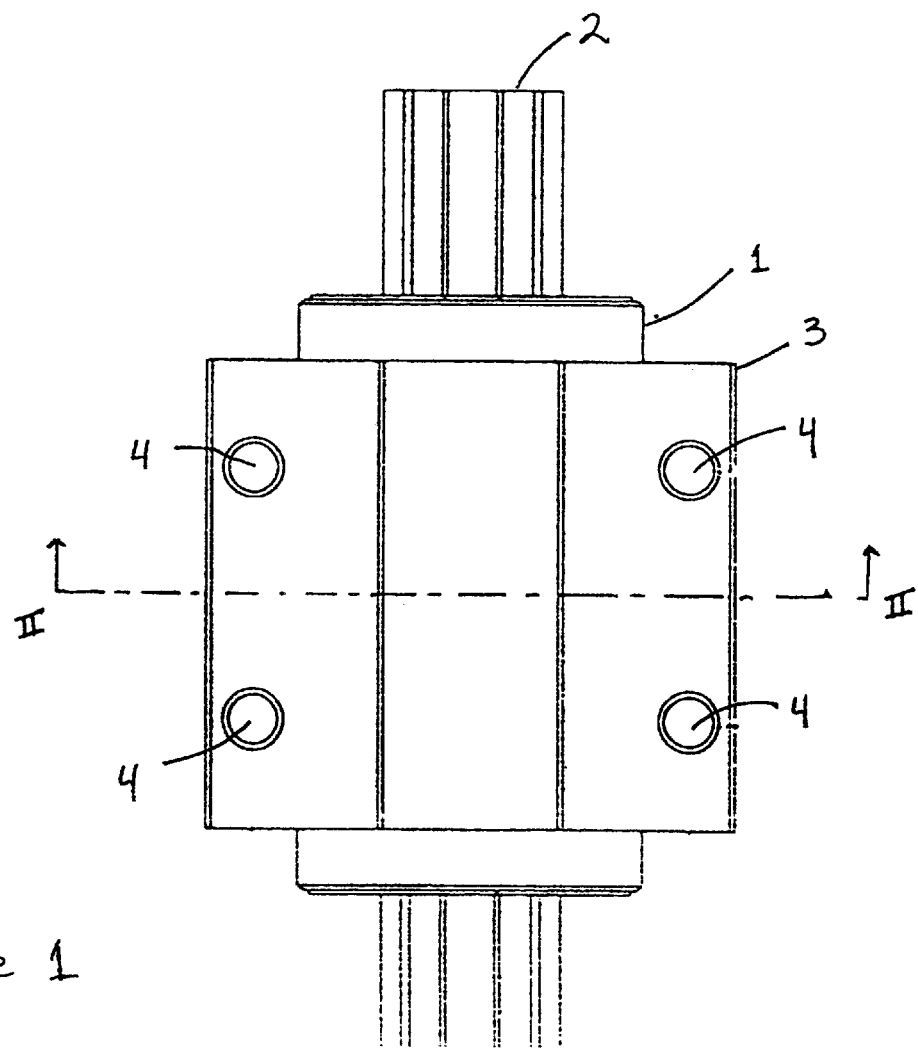
FIG. 1 is a top view of a conventional rail guided load transport system.

FIG. 1 is a top view of a conventional rail guided load transport system. The load transport system includes a load bearing saddle or platform 1 which travels along guide or rail 2. A load support stage 3 can be attached to saddle or platform 1. The load support stage 3 can include a number of apertures 4 that can be used to attach a load bearing structure to the support stage 3. The saddle or platform 1 can be driven along guide or rail 2 by conventional hydraulic, pneumatic or mechanical means.

Figure 2:
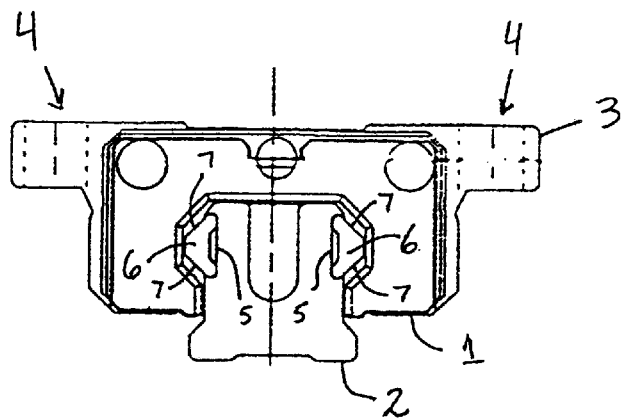
FIG. 2 is a cross sectional view of the rail guided load transport system of FIG. 1 taken along plane II—II.

FIG. 2 is a cross sectional view of the rail guided load transport system of FIG. 1 taken along plane II—II. FIG. 2 depicts the guide or rail 2 as having channels 5 into which bearing rails 6 are secured. The bearing rails 6 (also known as "ball guides") provide surfaces 7 along which ball bearings (not shown) of the bearing assembly can smoothly roll. As depicted in FIG. 2, the saddle or platform 1 is shaped to engage guide or rail 2 and the bearing rails 6. In this regard, the saddle or platform 1 includes a yoke-shape structure with a central channel that has a cross sectional shape which is complementary to the cross-sectional shape of the guide or rail 2 and bearing rails 6. In addition, clearance is provided between surfaces 7 of the bearing rails 6 and the yoke-shaped portion of the saddle or platform 1 for receiving and containing a plurality of ball bearings (not shown). The bearing assembly used in the rail guided load transport, which includes the bearing rails 6, allows for smooth precision movement of the saddle or platform 1 and any load thereon, along the guide or rail 2.

In the device of FIGS. 1 and 2, the bearing rails 6 are one-piece structures that are inserted, e.g. slid, into channels 5, and secured therein by applying a clamping force across channels 5. The clamping force deforms channels 5 so that bearing rails 6 are clamped within the channels 5.

Figure 3:
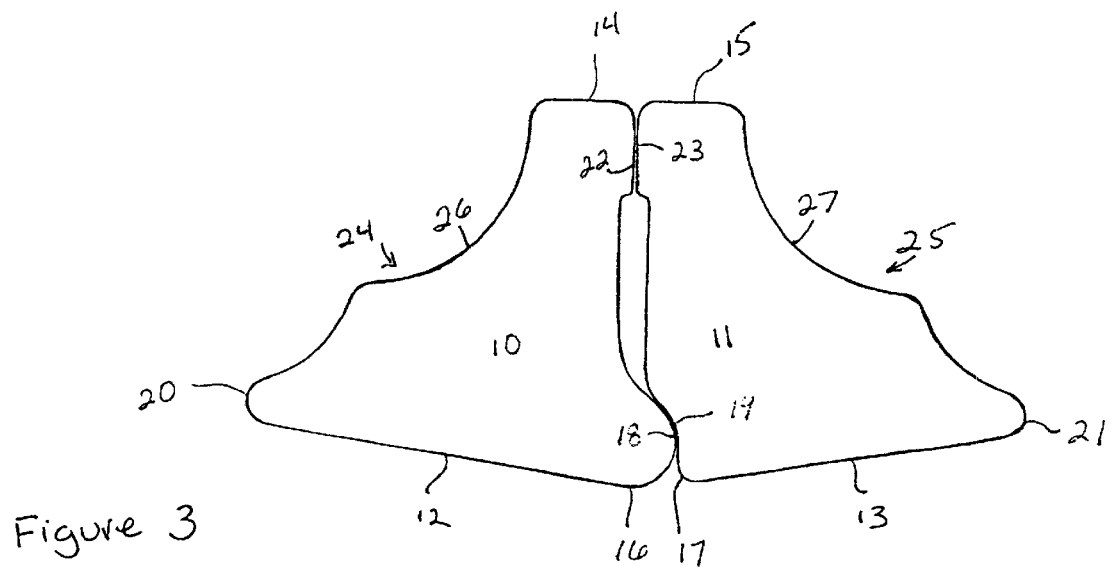
FIG. 3 is a cross sectional view of a bearing rail which is formed from a pair of split rail sections according to one embodiment of the present invention.

FIG. 3 is a cross sectional view of a bearing rail which is formed from a pair of split rail sections. FIG. 3 depicts the pair of split rail sections 10, 11 in the manner in which they would be arranged when coupled together in a channel of a base or support structure. Each rail section 10, 11 includes a base 12, 13, and an abutment portion 14, 15 that is in an opposed position from the base 12, 13. The base 12, 13 of each rail section 10, 11 includes a cooperating pivotal structure 16, 17. The cooperating pivotal structure 16 of one of the rail sections (12) can comprise a convex portion 18 and the cooperating pivotal structure 17 of the other rail section (13) can comprise a concave portion 19. The convex portion 18 and the concave portion 19 of the cooperating pivotal structures 16, 17 allow the rail sections 10, 11 to engage and pivot about one another as discussed in more detail below.

The outer edges 20, 21 of the base portions 12, 13 of the rail sections 10, 11, have a convex or radial shape which allows these edges to pivotally engage an undercut side portion of a rail channel as discussed below.

The abutment portion 14, 15 of the split rail sections 10, 11 include abutting faces 22, 23 which abut one another when the rail sections 10, 11 are engaged as depicted in FIG. 3. The outer surfaces 24, 25 of the split rail sections 10, 11 include bearing surfaces 26, 27 which are designed to receive, contain, and/or guide ball bearings. These bearing surfaces 24, 25 can be curved as depicted. In alternative embodiments, the bearing surfaces could be configured to receive, contain and/or guide roller bearings, pin bearings, or other types of bearing structures, including plastic bearing elements. The particular bearings, e.g. ball bearings, used in conjunction with the split rail system can be contained in a cage or channel in a known manner.

The abutment portions 14, 15 of the split rail sections 10, 11, are not limited to the exact shape depicted in FIG. 3, as long as abutting structures are provided between the split rail sections 10, 11. Thus, it can be understood that the shape of the top of the abutment portions 14, 15, the shape of the outer surfaces 24, 25 of the split rail sections 10, 11, and even the shape of the mid-portions of the bases 12, 13 of the split rail sections 10, 11 can vary without departing from the scope of the present invention. In addition, the shape of the bases 12, 13 of the split rail sections 10, 11 could be altered if a rail channel having a different cross sectional shape were used.

Figure 4:
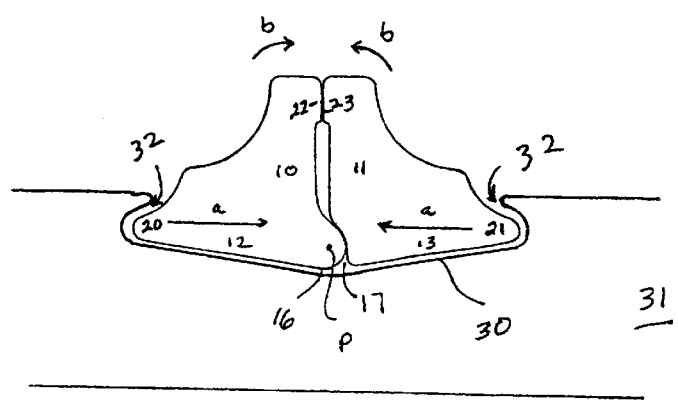
FIG. 4 is a cross sectional view of a bearing rail system according to one embodiment of the present invention which depicts the split rail sections coupled together in a rail channel.

FIG. 4 is a cross sectional view of a bearing rail system according to one embodiment of the present invention which depicts the split rail sections coupled together in a rail channel. The bearing rail system of FIG. 3 includes a pair of split rail sections 10, 11 that are received in rail channel 30 formed in base or support structure 31, such as, for example, a guide or rail for supporting a load-bearing transfer platform. As depicted, the rail channel 30 has undercut side portions 32 into which the outer edges 20, 21 of the base portions 12, 13 of the rail sections 10, 11, can be received and secured. The rail channel 30 can have a width which provides a tight fit for the rail section 10, 11 and causes a force to be applied to the outer edges 20, 21 of the base portions 12, 13 of the rail sections 10, 11. This force is directed in the direction indicated by arrow "a" in FIG. 4. When this force is directed above the pivot point "p" between the cooperating pivotal structures 16, 17, it urges the rail sections 10, 11 to pivot together in the direction indicated by arrows "b" so that the abutting faces 22, 23 are pushed together.

In the embodiment of the invention depicted in FIG. 4, the bottom of the rail channel 30 is inclined toward its center in order to provide clearance for the bases 12, 13 of the rail sections 10, 11. This clearance allows the pivot point "p" of the cooperating pivotal structures 16, 17 to rest below the level at which the forces represented by arrows "a" are applied across the bearing rail assembly. In alternative embodiments, the abutting faces 22, 23 of the split rail sections 10, 11 could be provided with engageable structures such as projecting beads and channels (discrete or continuous), or engageable structures such as hooks which hold the abutting faces 22, 23 together. The use of such engageable structures would allow the use of a rail channel 30 having a flat bottom.

Figure 5A:
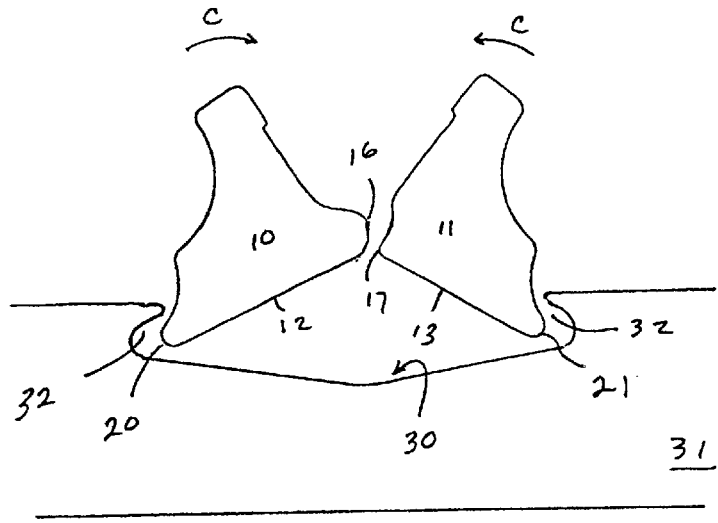
FIGS. 5a–5d depict how the split rail sections of FIG. 4 are coupled together so that they interlock in the rail channel.
Figure 5B:
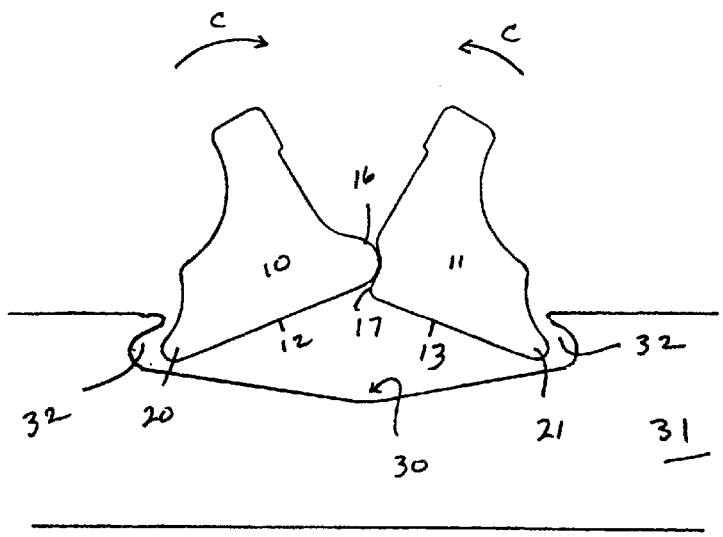

FIGS. 5a–5d depict how the split rail sections are progressively coupled together so that they interlock in the rail channel. In FIG. 5a the outer edges 20, 21 of the bases 12, 13 of the rail sections 10, 11 are positioned so that they are within the undercut side portions 32 of the rail channel 30. Once the outer edges 20, 21 of the bases 12, 13 of the rail sections 10, 11 are positioned within the undercut side portions 32 of the rail channel 30, they are pivoted together as indicated by arrow "c" so that their cooperating pivotal structures 16, 17 contact or engage one another as depicted in FIG. 5b.

Figure 5C:
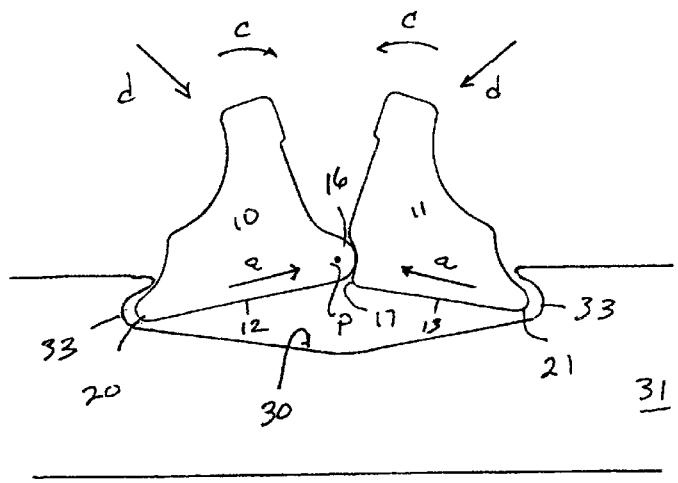

Next, the rail sections 10, 11 are pushed together and downward as indicated by arrows "c" and "d" in FIG. 5c so that they pivot about pivot point "p" of the cooperating pivotal structures 16, 17 and moved downward into rail channel 30. At this point, the contact or engagement between the outer edges 20, 21 of the bases 12, 13 of the rail sections 10, 11 with the inner edges 33 of the rail channel 30 generates a force that extends from the contact point between the outer edges of the bases 13, 14 of the rail sections 10, 11 to the pivot point "p" of the cooperating pivotal structures 16, 17 as indicated by arrow "a" in FIG. 5c.

Figure 5D:
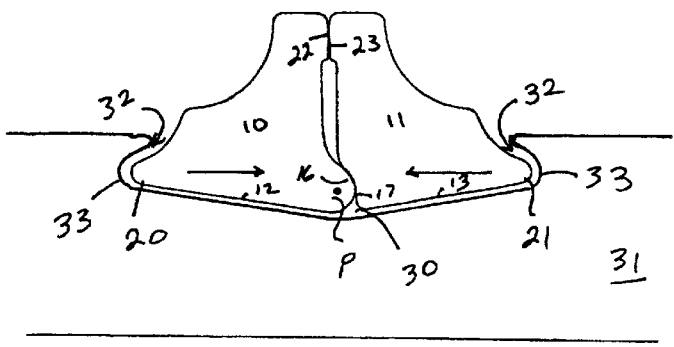

Continual pressing or pushing of the rail sections 10, 11 together and downward as indicated by arrows "c" and "d" in FIG. 5c will result in the rail sections 10, 11 coupling together as depicted in FIG. 5d (and 4). In FIG. 5d the abutting faces 22, 23 of the rail sections 10, 11 contact and abut one another and the pivot point "p" of the cooperating pivotal structures 16, 17 rests below the level at which the forces represented by arrows "a" are applied by across the bearing rail assembly.

It can be understood from FIGS. 5a–5d how the overall or effective base of the split rail system (comprised of the individual bases 12, 13) is expanded when the split rail sections 10, 11 are engaged and pivoted about one another. Thus, when outer edges 20, 21 of the split rail sections 10, 11 are positioned within a rail channel 30 and pivoted about their engaged cooperating pivotal structures 16, 17, the overall or effective base of the split rail assembly is expanded so that the split rail system becomes wedged in the rail channel 30.

Figure 6:
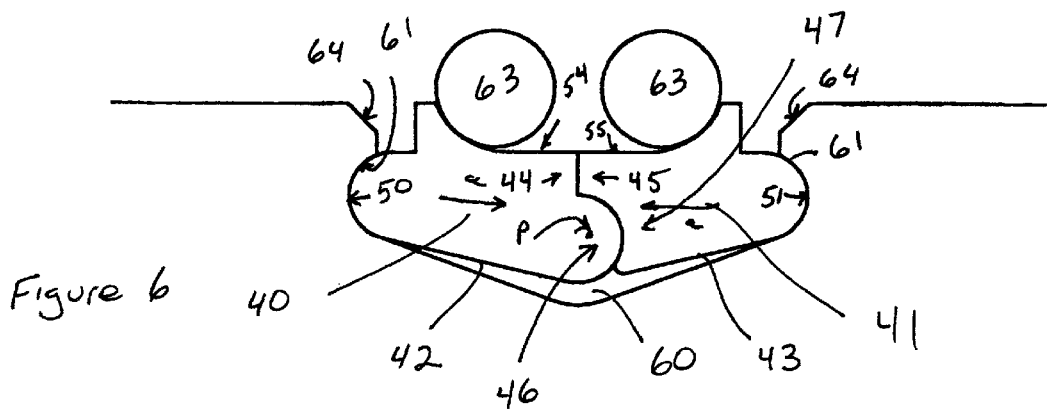
FIG. 6 is a cross sectional view of a bearing rail system according to another embodiment of the present invention which depicts the split rail sections coupled together in a rail channel.

FIG. 6 is a cross sectional view of a bearing rail system according to another embodiment of the present invention which depicts the split rail sections coupled together in a rail channel. FIG. 6 depicts the pair of split rail sections 40, 41 coupled together in a channel 60 of a base or support structure. Each rail section 40, 41 includes a base 42, 43, and an abutment portion 44, 45 that is in an opposed position from the base 42, 43. The base 42, 43 of each rail section 40, 41 includes a cooperating pivotal structure 46, 47. The cooperating pivotal structure 46 of one of the rail sections (42) can comprise a convex portion as depicted and the cooperating pivotal structure of the other rail section (43) can comprise a complementary shaped concave portion as shown. The convex portion and the concave portion of the cooperating pivotal structures 46, 47 allow the rail sections 40, 41 to engage and pivot about one another as discussed in more detail below.

The outer edges 50, 51 of the base portions 42, 43 of the rail sections 40, 41, have a convex or radial shape which allows these edges to pivotally engage an undercut side portion 61 of a rail channel 60 as discussed below.

The abutment portion 44, 45 of the split rail sections 40, 41 include abutting faces 52, 53 which abut one another when the rail sections 40, 41 are engaged as depicted in FIG. 6. The outer surfaces 54, 55 of the split rail sections 40, 41 include bearing surfaces 56, 57 which are designed to receive, contain, and/or guide ball bearings 63. These bearing surfaces 54, 55 can have upwardly curved ends as depicted to retain bearings 63. In alternative embodiments, the bearing surfaces could be configured to receive, contain and/or guide roller bearings, pin bearings, or other types of bearing structures, including plastic bearing elements. The particular bearings, e.g. ball bearings, used in conjunction with the split rail system can be contained in a cage, channel or other structure in a known manner.

The abutment portions 44, 45 of the split rail sections 40, 41, are not limited to the exact shape depicted in FIG. 6, as long as abutting structures are provided between the split rail sections 40, 41. Thus, it can be understood that the shape of the top of the abutment portions 44, 45, the shape of the outer surfaces 54, 55 of the split rail sections 40, 41, and even the shape of the mid-portions of the bases 42, 43 of the split rail sections 40, 41 can vary without departing from the scope of the present invention. In addition, the shape of the bases 42, 43 of the split rail sections 40, 41 could be altered if a rail channel having a different cross sectional shape were used.

It is noted that the rail system of the present invention can be made flexible by providing a gap between the bases of 42, 43 of the split rail sections 40, 41 and the bottom of channel 60 as indicated in FIG. 6. Making the rail system flexible can help control the pressure on bearings 63 and alignment thereof with structure or devices which are designed to move along the bearing rail system.

Figure 7:
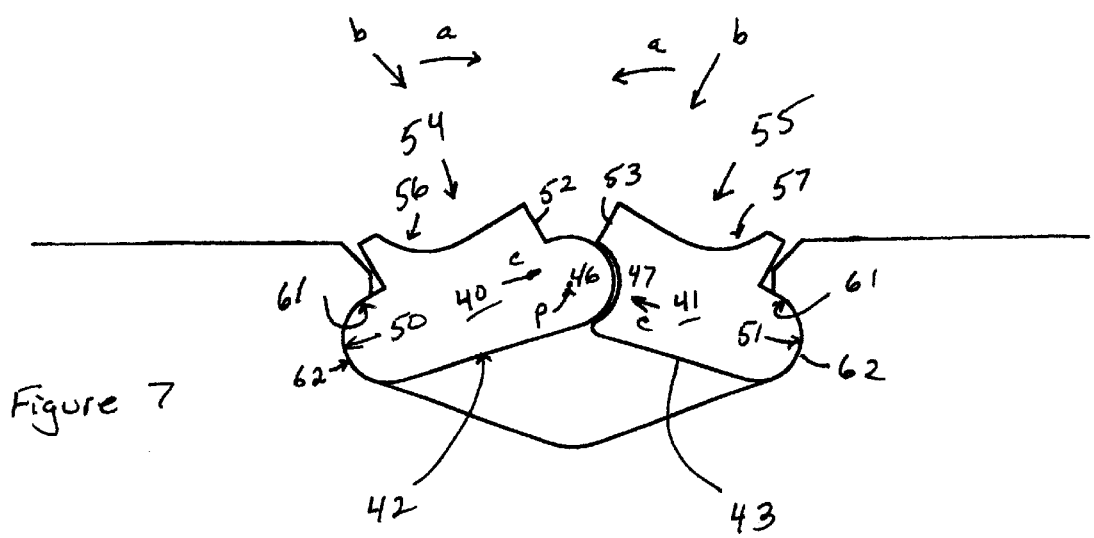
FIG. 7 depicts how the split rail sections of FIG. 6 are coupled together so that they interlock in the rail channel.

FIG. 7 depicts how the split rail sections of FIG. 6 are coupled together so that they interlock in the rail channel. In FIG. 7 the outer edges 50, 51 of the bases 42, 43 of the rail sections 40, 41 are positioned so that they are within the undercut side portions 61 of the rail channel 60. Once the outer edges 50, 51 of the bases 42, 43 of the rail sections 40, 41 are positioned within the undercut side portions 61 of the rail channel 60, they are pivoted together so that their cooperating pivotal structures 46, 47 contact or engage one another as depicted in FIG. 7.

Next, the rail sections 40, 41 are pushed together and downward as indicated by arrows "a" and "b" in FIG. 7 so that they pivot about pivot point "p" of the cooperating pivotal structures 46, 47 and moved downward into rail channel 60. At this point, the contact or engagement between the outer edges 50, 51 of the bases 42, 43 of the rail sections 40, 41 with the inner edges 62 of the rail channel 60 generates a force that extends from the contact point between the outer edges 50, 51 of the bases 43, 44 of the rail sections 40, 41 to the pivot point "p" of the cooperating pivotal structures 46, 47 as indicated by arrow "c" in FIG. 7.

Continual pressing or pushing of the rail sections 40, 41 together and downward as indicated by arrows "a" and "b" in FIG. 7 will result in the rail sections 40, 41 coupling together as depicted in FIG. 6. In FIG. 6 the abutting faces 52, 53 of the rail sections 40, 41 contact and abut one another and the pivot point "p" of the cooperating pivotal structures 46, 47 rests below the level at which the forces represented by arrows "c" are applied by across the bearing rail assembly.

It can be understood from FIGS. 6 and 7 that the overall or effective base of the split rail system (comprised of the individual bases 42, 43) is expanded when the split rail sections 40, 41 are engaged and pivoted about one another. Thus, when outer edges 50, 51 of the split rail sections 40, 41 are positioned within a rail channel 60 and pivoted about their engaged cooperating pivotal structures 46, 47, the overall or effective base of the split rail assembly is expanded so that the split rail system becomes wedged in the rail channel 60.

The rail sections 42, 43 in FIGS. 6 and 7 have outer edges 50, 51 which have circular cross-sectional shapes which are received in complementary shaped (circular cross-sectional) under-cut side portions 61 of rail channel 60. In addition, the convex portion and the concave portion of the cooperating pivotal structures 46, 47 of the rail sections 40, 41 have complementary circular cross-sectional shapes. The use of such complementary circular cross-sectional shapes allows the corresponding elements to pivot smoothly about fixed pivot points.

It is noted that the upper edges 64 of rail channel 60 can be beveled as depicted in FIGS. 6 and 7 to provide clearance for the upwardly curved ends of bearing surfaces 54, 55. Such clearance may be necessary depending on the shape of the bearing surfaces 54, 55 in order to insert the rail sections 40, 41 into a rail channel 60 as shown in FIG. 7

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described in the claims that follow.

What is claimed:

1. A bearing rail assembly which comprises:
   an elongate support;
   at least one elongate channel formed in a surface of the elongate support; and
   a pair of elongate bearing rail elements that are configured to interlock together within the at lease one elongate channel and present bearing support and guide surfaces.

2. A bearing rail assembly according to claim 1, wherein the at least one elongate channel includes opposed undercut side edges and the pair of elongate bearing rail elements each have bases with outer edges that are configured be positioned within the undercut side edges.

3. A bearing rail assembly according to claim 2, wherein the bases of the pair of elongate bearing rail elements further include cooperating pivotal structures that are configured to engage one another.

4. A bearing rail assembly according to claim 3, wherein the pair of elongate bearing rail elements each have abutting structure which limit the pivotal range of motion about the cooperating pivotal structures.

5. A bearing rail assembly according to claim 2, wherein the opposed undercut side edges of the at least one elongate channel have beveled upper surfaces.

6. A bearing rail assembly according to claim 1, wherein the bearing support and guide surfaces have substantially flat portions with upwardly curved ends.

7. A bearing rail assembly according to claim 1, wherein the at least one elongate channel has a bottom which that is slopped downward toward a center thereof.

8. A bearing rail assembly according to claim 1, wherein the bearing support and guide surfaces are curved.

9. A bearing rail assembly of claim 1, wherein the at least one elongate channel comprises two parallel elongate channels.

10. A bearing rail assembly of claim 9, wherein the elongate support comprises a linear transport assembly.

11. A bearing rail assembly of claim 9, wherein the elongate support comprises a rodless cylinder.

\* \* \* \* \*